(12) United States Patent
Chen et al.

(10) Patent No.: US 7,860,311 B2
(45) Date of Patent: Dec. 28, 2010

(54) VIDEO OBJECT SEGMENTATION METHOD APPLIED FOR RAINY SITUATIONS

(75) Inventors: Chao-Ho Chen, Tai-Nan (TW); Hung-Shiuan Liau, Nan-Tou (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 785 days.

(21) Appl. No.: 11/849,348

(22) Filed: Sep. 3, 2007

(65) Prior Publication Data

US 2008/0187219 A1 Aug. 7, 2008

(30) Foreign Application Priority Data

Feb. 5, 2007 (TW) .............................. 96104153 A

(51) Int. Cl.
*G06K 9/34* (2006.01)
(52) U.S. Cl. ..................................................... 382/173
(58) Field of Classification Search ................. 382/103, 382/107, 173, 181, 190, 236, 274
See application file for complete search history.

(56) References Cited

U.S. PATENT DOCUMENTS 5,838,828 A * 11/1998 Mizuki et al. ............... 382/236
2006/0115154 A1* 6/2006 Chen .......................... 382/181

* cited by examiner

*Primary Examiner*—Duy M Dang
(74) *Attorney, Agent, or Firm*—Winston Hsu; Scott Margo

(57) ABSTRACT

A video object segmentation method takes advantage of edge and color features in conjunction with edge detection and change detection to improve the accuracy of video object segmentation for rainy situations. The video object segmentation method of the present invention includes analyzing HSI-color information of the initially extracted objects to obtain features of the moving object; performing edge detection to obtain edges of the moving object for reducing the effect of confusing raindrops with moving objects in rainy dynamic background; performing object region detection to generate an accurate object mask for solving the uncovered-background problem and the still-object problem; and employing a bounding-box based matching method for solving the reflection problem of the moving object in the rained ground.

23 Claims, 11 Drawing Sheets

| Region Description | Background Substraction Mask | Frame Difference Mask |
|---|---|---|
| Background Region | OFF | OFF |
| Uncovered background Region | OFF | ON |
| Still Region | ON | OFF |
| Moving Region | ON | ON |

Fig. 5

VIDEO OBJECT SEGMENTATION METHOD APPLIED FOR RAINY SITUATIONS

BACKGROUND OF THE INVENTION

1. Field of the Invention

The present invention relates to a video object segmentation method, especially a video object segmentation method applied for rainy situations.

2. Description of the Prior Art

In recent years, development of computer- and communications-related technologies has become more holistic and abundant, with digital multimedia having a variety of humanized interface functions becoming one weight-bearing technology under development. This is due to its ability to pass focused information with great significance to users directly. Thus, many related studies are being developed and digital multimedia is deeply affecting human lives. Digital multimedia technology not only includes music and images, which seen frequently, but also integrates other media, such as text, sound, video and graphs. In "3C" (computer, communication, and consumer electronics) integrated products, multimedia technology is ubiquitous. For example, MP3 technology, mobile phones with video recording functionality, and electronic clothing with futuristic style, are all gathering diverse multimedia technologies into one product. In a diverse, multi-functional multimedia field, video technology is one of the primary technologies under study. Compared with a single, static image, a dynamic analysis process of video technology not only comprises technology for processing the single, static image but also comprises analysis of change with time. In other words, if video could be seen as contiguous single images changing with time, and video information included increases drastically as time passes, then there exist certain difficulties in video multimedia technology and processing of large amounts of information that the video multimedia technology needs.

Modern video multimedia technology has advanced from a low-level analysis process, or description and analysis of luminance, color and texture, to a high-level characteristic description studying the meaning and concept of the multimedia content, e.g. studying the concept of the abstract relationship between objects and events. Advancements in video technology make it possible that users can interact more directly, so as to help comprehend each other. The above concept of interaction can be seen from the video compression standards of MPEG-4 and later-developed MPEG-7. The future development of video technology takes objects as elementary operating elements, utilizes the meaningful object in video to realize object-oriented compression technology, and then realizes description and interaction of the object. In order to perform the above-mentioned functions, video object segmentation is the critical technology. If the video object can be segmented precisely, then the compression rate of the compression algorithm will be increased. For processing related to the video content, e.g. searching for similar video objects on the Internet or a database, accuracy of the searching and speed of the searching both depend on technology used for segmenting the video objects. In addition, the video object segmentation is a process that precedes application of most computer visual discrimination. Thus, segmenting the object from the video images occurs first, then tracing, counting, discriminating, and analyzing the actions of the object can be performed.

Video object segmentation is different from static image segmentation, because video object segmentation considers not only spatial content change, but also information on temporal change. Therefore, the video object segmentation provides information about movement of the object, which is not included in the static image segmentation. And, because of the added object movement information, the video object segmentation is more practicable than the static image segmentation. Using the movement information offered by the change of the object along the time axis, in conjunction with the assistance of low-level characteristics of the object, the accuracy of the video object segmentation can be increased. But, variable factors in the active video environment cause other problems in video processing. For example, raindrops can be erroneously determined as the moving object due to the variable background in a rainy environment. The raindrops can also influence the accuracy of segmenting the moving object.

Normally, the video object segmentation methods can be classified into 2 categories: automatic video object segmentation and semi-automatic video object segmentation. Automatic video object segmentation methods, also called unsupervised formula video object segmentation methods, segment the video object automatically using a computer. Semi-automatic video object segmentation methods, also called supervised formula video object segmentation methods, define the segmentation object region prior to segmenting, and then segment following frames according to the characteristics of the defined object region. Generally speaking, automatic video object segmentation algorithms can be classified as video object segmentation methods based on object edge information, video object segmentation methods based on the time and spatial domain, and video object segmentation methods based on change detection. However, video object segmentation methods based on interaction with the user belong to semi-automatic video object segmentation algorithms.

The segmentation algorithm based on object edges mainly utilizes a Canny edge detection operator to get the information about the object shape. First, the difference between two adjacent frames is calculated, and the Canny edge detection operator is used to produce a double object edge map. Afterwards, the object edges in the present frame are taken out, and the object shape is derived from the combination of the moving and static edges. A more complete shape of the object is then derived through the intersection of the vertical and horizontal detections, and a post-process morphology operation. However, in the segmentation algorithm, because the object is segmented with the Canny operator, and the Canny operator decides the edge reliability by a gradient, when the texture of the object region and the texture of the background region are similar, or when the object edges are fogged by the influence of raindrops, the gradient of the difference is hard to obtain, such that the object edge can be lost, and the error rate for determining moving and static edges will increase, further causing an obvious difference between the original object shape and the segmented object shape.

The video object segmentation method combined with the information about the time and spatial domains is presently the most popular video object segmentation algorithm. It utilizes the segmentation region in the spatial domain to make up for segmentation weakness in the time domain so as to offer a more precise position of the object shape. Commonly used spatial segmentation methods include watershed technology, K-mean technology, etc. The main three parts of the algorithm are: time domain, spatial domain, and a combination of the time and spatial domains. The time domain includes three steps: estimation and compensation for shift in the whole moving region, detection of scene change and the core segmentation. The whole moving region estimation and compensation overcomes the dynamic motion of the camera, and the scene change detection detects whether there is a scene change in the input video frames. Both can be seen as pre-processing in the time domain. Subsequently, core segmentation is performed, the motion information is derived from the change detection, and the possibility estimation method is utilized to determine whether the pixels change or not. Subsequently, in the spatial domain, the spatial segmentation of the algorithm is performed. The spatial segmentation of the algorithm mainly utilizes the low image content, classifying the meaningful regions of the image. However, the segmented region still differs from what would be recognized by human visual perception, because some regions that should be segmented to different regions according to the human eye are still segmented to the same region by the computer.

The watershed segmentation method mainly classifies pixels of the image having similar gray scale to the same region, and in the watershed segmentation algorithm, the immersion-based method is the most often used. The immersion-based method begins with a position of a minimum value of the region, which is also the position of the minimum value of the gradient image. Imagine digging a hole, and water flooding from the hole, the water level becoming higher and higher. This example is analogous to classifying the pixels of similar gradient value to the same region, and then gradually broadening the region until the maximum value of the image gradient, which is the highest point of the plane, is reached. Afterwards, a dam is built, with the main purpose being to prevent water in different regions from flooding each other. Finally, the derived information of the time and spatial domain are combined to obtain the final shape of the object region.

However, the watershed segmentation method is sensitive to noise and easily influenced by noise, especially in a rainy environment, where the raindrops become an abundant source of noise. Too much noise leads to excessive segmentation. For example, the whole face region of a man should be determined as the same region, but because of the influence of the raindrops noise, the whole face region will be segmented into many small regions, therefore requiring performance of a region-merging algorithm afterward to solve the problem of the excessive segmentation. But such an algorithm increases the load of the system, and also increases the difficulty of integration into a real time system.

The K-Mean cluster technology divides the region into K similar regions. An AND operation is performed on each K-Mean cluster region and the corresponding result region derived from the change detection. If the result of the AND operation dividing the pixel number of the region is greater than a default threshold value, then the region is set as the moving region. Then, the region description operator is utilized to obtain the moving object. The shortcoming of this method is that the threshold value is not taken from the most suitable video content, so the derived moving region is not perfect, because most of the object in the foreground belongs to the still region. Therefore, after change detection, the result will be omitted. In contrast, the drastic variation of the raindrops will be determined as the object part in the foreground erroneously. Therefore after the operation of the region segmentation, the object in the foreground is hard to take out, and the raindrops gathering region is determined erroneously as the object in the foreground, which is not desirable. Although the unwanted object in the foreground can be eliminated, and the complete object shape can be derived by the region description operator later on, it takes much time to execute the comparison and calculation between the current and previous frames. When applied to the real time system, the prior art faces great difficulty, and furthermore how the number of classification of the K-Mean cluster technology should be decided is also a very important issue for video segmentation.

Regarding the algorithm based on change detection, its purpose is to detect the change between adjacent frames, and the most direct change detection method is performing subtraction between two adjacent frames. The derived difference represents the change degree of the object between two adjacent frames and is used as the change reference between two adjacent frames. After change detection, the derived result of the object mask should be processed further in order to obtain the complete object shape. Because the difference between frames is utilized to decide the motion information, resistance to external interference, such as light change, shadow, or noise is low, it cannot be applied to rainy circumstances, in which many raindrops are included, but the algorithm based on this method requires a relatively lower quantity of calculations.

When the moving object has moved for a period of time, if the moving object suddenly stops, or moves very slowly, based on the change detection method, part of the motion information is lost. Some inventions in the prior art raise solutions to address this problem, but are not capable of solving the problems of light change and shadow effect. For example, the amount of rain leads to the light change on the image shot in the rainy environment directly, and the dynamic reflection effect on the rainwater gathered on the ground is another problem. Furthermore the uncover background problem exists inherently. All of these problems lead to the erroneous determinations. The conventional technology utilizes the motion estimation method to determine whether the displacement vector in the change region at time k corresponds to the change region at time k+1. If so, then the region is determined as the object in the foreground. Otherwise, the region is determined as the background region. But, because the method utilizes the motion estimation, the accuracy of the edges is low. Furthermore, this method can only process translation-type objects. Other variations, e.g. rotation, may be determined erroneously, therefore increasing the complexity of the calculation in the system.

Finally, the video object segmentation method based on interaction with users allows the user aiming at the object intended for segmentation to define a bounding box on the shape of the object by hand first, and afterwards in the following frames, according to the characteristic of the bounding box region, perform the contiguous tracing and updating, incorporating the low-level characteristic to obtain the object region. This kind of segmentation method obtains more accurate object edges, but when the relationship between the derived characteristics is not close, the update of the shape leads to a wrong determination and lowers the accuracy. For example, in the rainy environment, because the raindrops fog the object edges and cause a high error rate in the update of the shape, the development of this method is limited.

From the above, each conventional algorithm has its own weaknesses, and the rainy environment influences and seriously lowers the accuracy of the video analysis and segmentation.

SUMMARY OF THE INVENTION

A method for video object segmentation applied to rainy situations for segmenting a moving object from video images shot in rainy circumstances, comprising detecting a first frame of video and then determining a plurality of edge pixels and a plurality of non-edge pixels; detecting a second frame of the video just before the first frame, and then determining a plurality of edge pixels and a plurality of non-edge pixels; comparing the plurality of edge pixels of the first frame with the plurality of edge pixels of the second frame, and then determining a plurality of still edge pixels and a plurality of moving edge pixels in order to produce at least one moving edge connection region; according to a result of determining the plurality of still edge pixels and the plurality of moving edge pixels, determining the moving object in the first frame; and updating a composition of a background.

The method of mentioned above wherein determining the moving object in the first frame comprises detecting differences between the first frame and the second frame to produce a detected result; segmenting the first frame into a moving region, a still region, a background region, and an uncovered background region according to the detected result to produce a segmented result; producing an initial object mask (IOM) according to the segmented result; storing a plurality of moving edge pixels of at least one moving edge connection region in a queue as pixel seeds for region growth in a growth region, taking out a pixel seed in order from the queue, determining if an adjacent pixel belongs to the growth region and storing the adjacent pixel in the queue if a difference between a pixel value of the pixel seed and a pixel value of the adjacent pixel is less than a threshold value, and then continuing region growth to produce the growth region; determining the moving object from the first frame according to the growth region and the initial object mask.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 shows the lists of the determined results of four different regions in FIG. 4 with the object region detection method.

DETAILED DESCRIPTION

Some concepts of the present invention have already been published in the proceedings of conference, as described below: Da-Jinn Wang, Thou-Ho (Chao-Ho) Chen, Hung-Shiuan Liau, Tsong-Yi Chen, "A DCT-Based Moving Object Extraction Algorithm for Rainy Situation", IEEE 2006 International Conference on Innovative Computing, Information and Control (ICICIC-06), Beijing, P. R. China, Aug. 30-Sep. 1, 2006. (pp. 261-264)

For images shot outdoors in rainy environments, the present invention provides a video object segmentation method based on edge detection and change detection, and in order to reduce the load of the system calculations when applied in a real time system, the present invention comprises receiving motion information from the change detection in order to replace the motion estimation method whose calculation is heavier and more complicated, and raising the accuracy of an object shape with a spatial domain segmentation method in order to decrease the influences on the change detection method caused by dynamic rainy conditions. Because in the spatial domain each frame has to execute spatial cuts, in order to decrease the calculations of the spatial cuts, the present invention utilizes a method of gradient threshold whose calculations are not so heavy to obtain the edge information of a moving object. Furthermore, considering the rain impacts on frames, the frame easily becomes vague, making it difficult to obtain a stable object edge because of the impact of the rain, so the present invention also discloses a method of determining the edge of an object through color spatial transformation and analysis in order to obtain color information that raises the accuracy of segmentation results.

Figure 1:
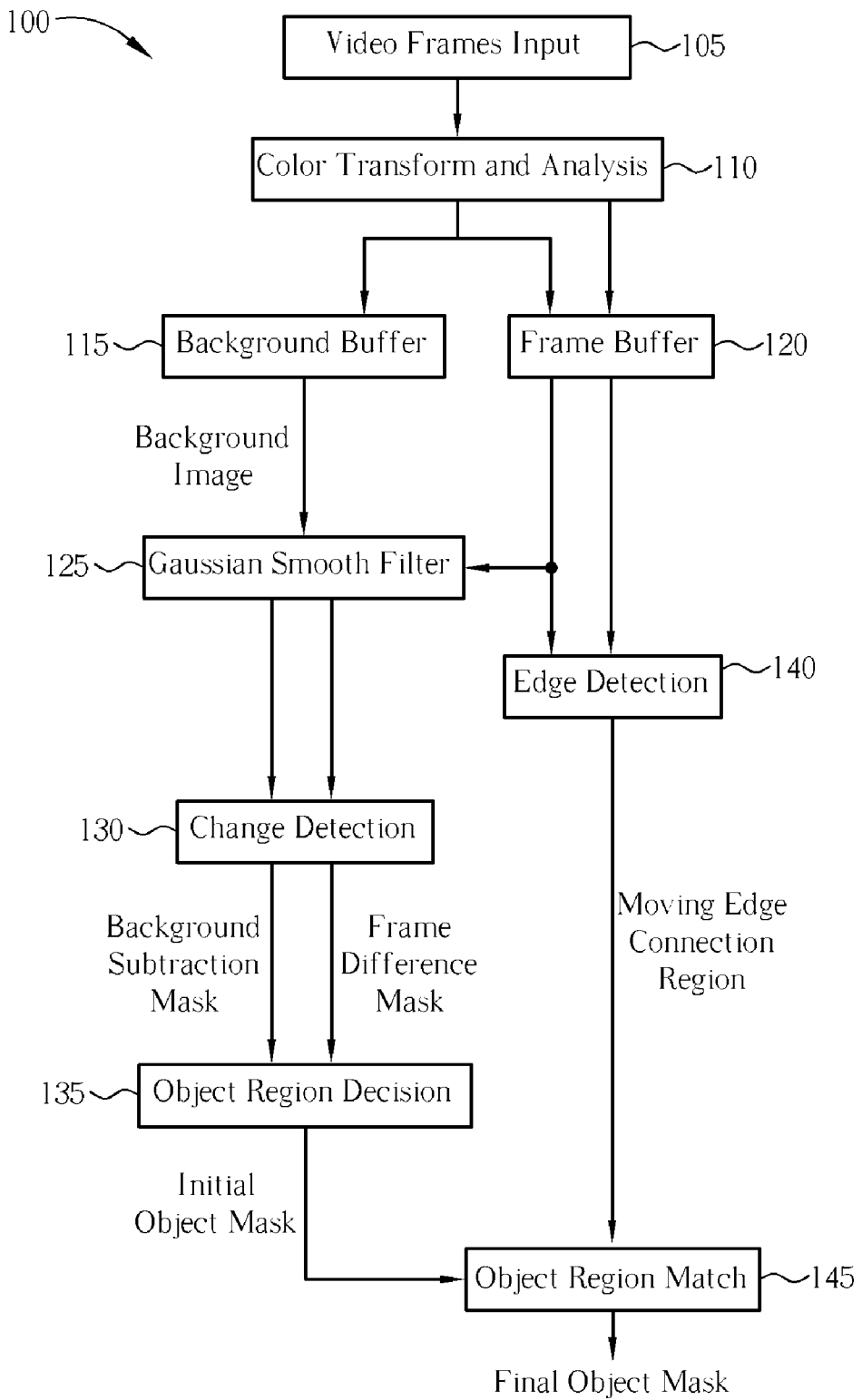
FIG. 1 is a functional block flow chart of the video object segmentation algorithm of the present invention.

Please refer to FIG. 1. FIG. 1 is a functional block flow chart 100 of the video object segmentation algorithm of the present invention. The functional block flow chart 100 comprises an input of video frames 105, a color transformation and analysis 110, a background buffer 115, a frame buffer 120, a Gaussian smooth filter 125, a change detection 130, an object region decision 135, an edge detection 140, and an object region match 145. Suppose the backgrounds of the input video frames are still, and the video camera is also fixed, because in many applications, such as a surveillance system, or a traffic flow rate counting system, the video information is all shot and analyzed under still background conditions. Therefore, the input of video frames 105 is for receiving video frames transmitted from the surveillance system, and the frame buffer 120 is for storing a plurality of video frames processed by the color spatial transformation and analysis 110 temporarily. Detailed description of other functional blocks follows below.

Humans can discriminate objects even in rainy circumstances because of being able to sense dynamic information, mainly because of an ability to sense a color distribution of an environment. Therefore, the present invention utilizes a color spatial transformation to transform from RGB mode to HSI mode (Hue, Saturation, Illumination), and with illumination information as a core component of motion segmentation, incorporates hue and saturation information to compensate for defects in segmenting objects.

From the above, generally speaking, segmentation algorithms analyze the efficiency of video segmentation targeting both the time domain and the spatial domain. In the time domain, a method applied commonly is change detection, and in the spatial domain, a method applied commonly is determining relationships between edges of objects, textures, and color regions. Up to now, segmentation algorithms mostly use indoor environments for a default scene, so that the impact external factors have on segmentation algorithms is not serious, thereby maintaining the accuracy of segmentation. However, applications of video media are not confined to indoor use. Once the video media is applied outdoors, the impact of the environment becomes very complicated. The most troublesome impact is the change of climate, especially on rainy days. Compared with sunny days and indoors, rainy conditions keep the video frames in a changing state. Further, the light source is not as bright on rainy days as on sunny days. Finally, the translucence of raindrops makes the video frames more vague. In such situations, most segmentation algorithms can hardly function, but the reason humans can discriminate moving objects on rainy days is because humans sense the dynamic information of moving objects, mainly due to their ability to sense color differences. Therefore, the present invention lowers the impact of rainy days by taking color information into consideration.

In order to simulate the characteristics of human visual perception of color, the most common method is to separate illumination information from a colorful image by a mathematic transformation. In many color transformation models, the HSI model is the most suitable model for simulating the characteristics of human visual perception of color. In the HSI model, "hue" represents a colorful attribute of color, "saturation" represents degrees of white light added to pure color, and "illumination" represents brightness of color. Therefore, pixels are transformed from an RGB model into "H" (hue), "S" (saturation), and "I" (illumination) composition through the following formulas:

$$I = \frac{1}{3}(R+G+B) \quad \text{Formula (1)}$$

$$S = 1 - \frac{3}{(R+G+B)}[\min(R, G, B)] \quad \text{Formula (2)}$$

$$H = \begin{cases} \theta, & \text{if } B \leq G \\ 360 - \theta, & \text{if } B > G \end{cases}, \quad \text{Formula (3)}$$

$$\theta = \cos^{-1}\left\{\frac{\frac{1}{2}[(R-G)+(R+B)]}{\left[(R-G)^2+(R-B)(G-B)^{\frac{1}{2}}\right]}\right\},$$

$$0° \leq H \leq 360°$$

Formula (1) represents "I" (illumination) as the mean value of RGB intensity, Formula (2) represents "S" (saturation) as the pure chroma after excluding white light composition, and Formula (3) represents "H" (hue) as a color attribute with angles.

It is easy to recognize each moving object from its body's color. But when the R, G, and B components of the moving object are approximately equal, the saturation is near to zero, which means the image of the moving object is the equivalent of a black-and-white image, and it becomes difficult to recognize the moving object from its body's color. Therefore, a color transformation and analysis 110 is performed after transforming the RGB value of the moving object into the HSI value, firstly utilizing the "I" characteristic as an input of detecting motion information, and then utilizing "S" and "H" characteristics to determine the relationship between the moving object and the background in order to raise the accuracy of video object segmentation even under bad video circumstances.

According to the present invention, "I" (illumination) characteristic and the change detection method are utilized to obtain the information of a moving object. Therefore, a background model is estimated first, then the accuracy of separating the background and the foreground with the background model is raised. After color spatial transformation, the "H" (hue) and "S" (saturation) characteristics are analyzed with histograms in order to obtain a parameter of the background model with color characteristics.

Estimating the parameter of a background model is to estimate a background model from the current image and a difference image. Suppose a difference value of the still background region is caused by camera noise or rapid motion of raindrops, and the distribution of the difference values can be seen as a Gaussian distribution (in many situations, taking the camera noise or noise caused by the rapid motion of raindrops as a Gaussian distribution is acceptable). Suppose a pixel in the background region of the difference image is a random variable, and in a supposed Gaussian noise distribution, the function of probability density is the following formula:

$$p(d) = \frac{1}{\sqrt{2\pi\sigma_b^2}} e^{\left(\frac{(d-\mu_b)^2}{2\sigma_b^2}\right)} \quad \text{Formula (4)}$$

In Formula (4), $\mu_b$ and $\sigma_b$ show the mean value and variance of the background region, respectively.

Afterwards, the mean value of the background saturation, the mean value of the background hue, the standard deviation of the background saturation, and the standard deviation of the background hue are estimates. First, a frame difference of saturation and a frame difference of hue from the current frame to the previous frame, respectively, are performed in order to produce a hue difference image $DI_H$, and a saturation difference image $DI_S$. Then, $DI_H$ and $DI_S$ are analyzed with histograms, the hue of the most pixels and the saturation of the most pixels within a range parameter r are chosen as reference parameters of hue and saturation for the background estimation. Suppose the histogram of the hue difference image $DI_H$ and the histogram of the saturation difference image $DI_S$ can be expressed as two functions listed below:

$$His_H(p)=\text{Num}\{(i,j)|DI_H(i,j)=p,(i,j)\in DI_H\} \quad \text{Formula (5)}$$

$$His_S(p)=\text{Num}\{(i,j)|DI_S(i,j)=p,(i,j)\in DI_S\} \quad \text{Formula (6)}$$

In Formula (5), p represents a hue value, and in Formula (6), p represents a saturation value. Suppose within a range parameter r, $His_H(p')$ and $His_S(p')$ represent hue of the most pixels and saturation of the most pixels, respectively. If $His_H(p')$ is more than one, then the highest one is chosen to represent $His_H(p')$. If $His_S(p')$ is more than one, then the highest one is chosen to represent $His_S(p')$. The range parameter can be presupposed to equal 100.

When the pixels in $His_H(p')$ and $His_S(p')$ are decided respectively, the positions of pixels in $His_H(p')$ and $His_S(p')$ are corresponded to the positions of pixels in the current frame, and each pixel is taken as a center with a 3*3 estimation window. The two functions listed below are used together to estimate the mean value and the standard deviation in the estimation window:

$$\mu_{w_i}(p') = \frac{1}{N}\sum_{j=1}^{N} w_i(j) \text{ for } i = 1, 2, \ldots, His(p') \quad \text{Formula (7)}$$

$$std_{w_i}(p') = \sqrt{\frac{1}{N}\sum_{j=1}^{N}[w_i(j) - \mu_{w_i}(p')]^2}$$
for $i = 1, 2, \ldots, His(p')$ \quad Formula (8)

In Formula (7) and Formula (8), N represents the quantity of pixels in the estimation window. When p' represents the hue value, Formula (7) is for calculating the mean value of hue and Formula (8) is for calculating the standard deviation of hue, $w_i(j)$ represents a $j^{th}$ pixel in the estimation window of the $i^{th}$ pixel belonging to the most pixels with the same hue value, His(p') in Formula (7) and Formula (8) represents the quantity of the most pixels, and $His_H(p')$ represents the hue value of the most pixels. When p' represents the saturation value, Formula (7) is for calculating the mean value of saturation, and Formula (8) is for calculating the standard deviation of saturation, $w_i(j)$ represents the $j^{th}$ pixel in the estimation window of the $i^{th}$ pixel belonging to the most pixels with the same saturation value, His(p') in Formula (7) and Formula (8) represents the quantity of the most pixels, and His(p') represents the saturation value of the most pixels. According to Formula (7), the mean value of hue and the mean value of saturation $\mu_{wi}$ are estimated in the estimation window first, and then the $\mu_{wi}$ value is applied to Formula (8) to calculate the standard deviation of hue and the standard deviation of saturation $std_{wi}$ in the estimation window, respectively.

Afterwards, a total average calculation is performed on all the mean values $\mu_{wi}$ and all the standard deviations $std_{wi}$ according to the following two functions:

$$\mu_b = \frac{1}{His(p')}\sum_{i=1}^{His(p')} \mu_{w_i}(p') \quad \text{Formula (9)}$$

$$Std_b = \frac{1}{His(p')}\sum_{i=1}^{His(p')} std_{w_i}(p') \quad \text{Formula (10)}$$

then the background mean value and the background standard deviation of the estimated background model are obtained accordingly.

When His (p') in Formula (9) and Formula (10) is $His_H(p')$, Formula (9) is for calculating the mean value of background hue and Formula (10) is for calculating the standard deviation of background hue; when His(p') in Formula (9) and Formula (10) is $His_S(p')$, Formula (9) is for calculating the mean value of background saturation and Formula (10) is for calculating the standard deviation of background saturation. The initial definition of the variation range of saturation is between 0 and 1, but in order to accommodate the variation level of gray scale, the variation range of saturation is normalized to 0 to 255.

In the prior art, frequency division technology such as wavelets and DCT (discrete cosine transform) are utilized to filter the influence of rain variation on video frames. This technology succeeds in light rain but fails in heavy rain. Analyzing the reasons, it is because raindrops make variations in frames corresponding to changes in the time domain, but wavelets and DCT perform a frequency division action on only a single frame. Therefore, when the images are shot in the light rain, the frequency division technology can filter a small quantity of high frequency variations, which are caused by the light rain, but if the images are shot in the heavy rain, the frequency division technology cannot handle the high frequency variations between frames, which are caused by the heavy rain.

In many mathematical and scientific fields, a Gaussian function is a very important distribution function, and is often applied to a smoothing filter for video image processing. This is because in the period from the video images being input to the video images being processed by the algorithm, the video signals are susceptible to corruption by the interference of the image sensors, so that there are more or less some noises in the video signals. Therefore, the high frequency noise is filtered with a filter before the video signals are input in order to produce video signals with less noise. In video films shot in rainy conditions, the present invention utilizes a Gaussian smoothing filter 125 to exclude the variation influence of raindrops on a background frame, a current frame, and a previous frame. Besides the advantages of the above, because raindrops are transparent, and the Gaussian smoothing filter 125 aims at each pixel of the frame to perform a Gaussian smooth expansion, respectively, this method can exclude the influence of raindrops on video images and maintain the completeness of the frames. In the present invention, the 2D Gaussian functions of the Gaussian smoothing filter 125 can be defined as follows:

$$g(i,j) = x \times e^{-\frac{(i^2+j^2)^2}{2\sigma^2}} \quad \text{Formula (11)}$$

In Formula (11), i and j represent coordinate values of an image pixel; c is a constant value for deciding the height of the Gaussian function, and σ is a variable for deciding Gaussian expansion, which means that by adjusting the value of σ according to the influence noise plays on the video frames, as a increases, the smoothness of the image improves.

The frame difference process is the process of performing subtraction between two adjacent frames, and because of easy operation and high-efficiency qualities, this method is often applied to the pre-processing of the segmentation method based on the change detection 130. The variances in the difference frame can also be called "motion information" comprising the differences between a moving object region and a still background region. Contrasted with the background region, the motion object region will produce more differences, therefore the pixels with more drastic variation from the still background region are discriminated, and the discrimination procedures are so called "change detection 130". Generally speaking, the video images are easily affected by the interference of electric devices and the change of ambient illumination, so that the more drastic variations in the difference frame would not be caused only by the motion of the object, but also by other sources of interference. This is also a main defect of segmenting moving objects from video images with the method of subtracting the frames. In addition, in the algorithm of the present invention, the process of subtracting the background also belongs to the difference operation, but simply subtracts the background frame from the current frame.

Suppose the frames input at different times are $f_t(i,j)$ and $f_{t-1}(i,j)$, respectively, then the subtraction process of the image difference can be represented as the function:

$$d_t(i,j) = |f_t(i,j) - f_{t-1}(i,j)| \quad \text{Formula (12)}$$

In Formula (12), $f_t(i,j)$ represents the input frame at time t, $f_{t-1}(i,j)$ represents an input frame preceding $f_t(i,j)$, and $d_t(i,j)$ represents pixel difference between $f_t(i,j)$ and $f_{t-1}(i,j)$ at coordinate (i,j).

The experiment of the present invention aims at performing processing on different image frames. The different image frames include the background frame of "Rain_woman" shot under heavy rain conditions, which is also called the first image frame, the second image frame of "Rain_woman", and the difference image frame of "Rain_woman", which is the difference image frame between the first image frame and the second image frame.

After producing the difference image, the following step is to divide the difference image into a changed region and an unchanged region, cooperating with a threshold value to execute change detection. The gray scale of pixels in the difference image is compared with the background region, and if the gray level of the pixel is greater than the default threshold, then the pixel is determined to be in the change region, whereas if the gray level of the pixel is less than the default threshold, then the pixel is determined to be in the unchanged region. Therefore, the background model is estimated from the difference image first. In the prior art, the unchanged region of the previous frame is utilized according to a detected result of the change detection as the background region of the current frame. But, under high noise conditions, the obtained unchanged region does not match the real situation, and therefore the estimation mistakes are enlarged in the following steps.

Figure 2:
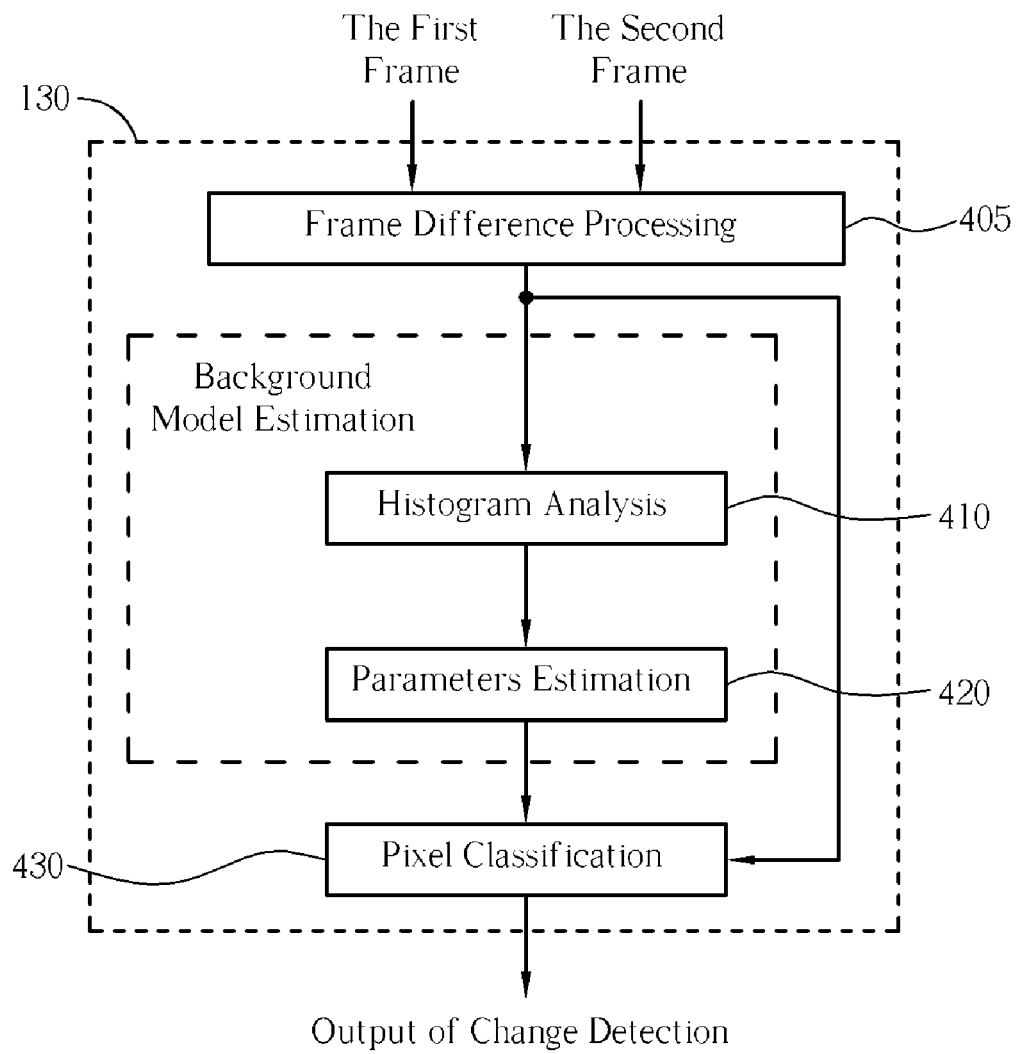
FIG. 2 is a functional block flow chart of the change detection of the present invention including the estimation from the background model.

In order to avoid the disadvantages of the prior art, the present invention estimates a color background model according to the color information from the beginning, and in the change detection, according to the illumination (I) information, determines an illumination background model. Please refer to FIG. 2. FIG. 2 is a functional block flow chart of the change detection 130 of the present invention including the estimation from the background model. The change detection 130 comprises a histogram analysis 410, a background parameter estimation 420, and a pixel classification 430. As described above, the change detection 130 is preceded by the frame difference process 405. When a first input frame is a background frame and a second input frame is a current frame, the change detection 130 outputs a background subtraction mask; when the first input frame is the current frame and the second input frame is the previous frame, then the change detection 130 outputs a frame difference mask.

Figure 3:
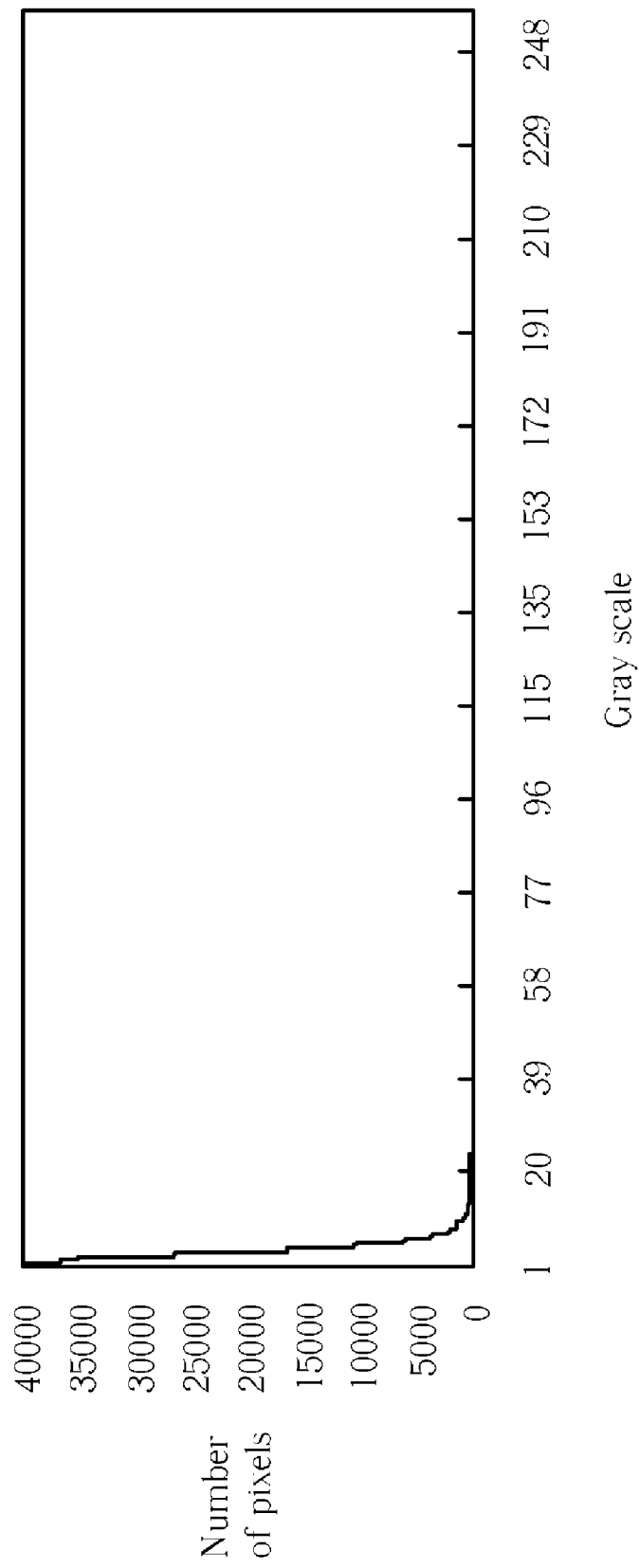
FIG. 3 is the histogram distribution of the difference image frame obtained from the first image frame and the second image frame according to the experiment of the present invention.

The function of the histogram analysis 410 mainly offers a distribution of gray scale or color of the difference image, and also through the histogram function, the follow-up analyses are supported. Generally speaking, the difference image comprises a still background and moving objects, and the moving objects often produce more drastic variations, and of course drastic variations are also possibly caused by noise. On the contrary, less drastic variations normally correspond to the background region, or the still part. Please refer to FIG. 3. FIG. 3 is the histogram distribution of the difference image frame obtained from the first image frame and the second image frame of "Rain_woman". According to FIG. 3, most of the gray level distribution is disposed near the region of zero gray level, and because through analyzing the gray level, the background region of the difference image frame is easily derived, therefore a gray scale of the most pixels within a gray scale range r is chosen as a reference parameter for the follow-up estimation. Suppose the histogram distribution of the difference image DI can be expressed by the following function:

$$His(p) = Num\{(i,j)|DI(i,j)=p, (i,j) \in DI\} \quad \text{Formula (13)}$$

In Formula (13), p is the gray scale value of the pixel, $DI(i,j)$ represents the gray scale value of the pixel in the difference image frame at coordinate (i,j), and $His(p)$ represents the pixel number with the gray scale value p in the difference image frame. Therefore within a gray scale range r, if the gray scale value of the most pixels is p', the number of the most pixels is $His(p')$. If there is more than one p' corresponding to $His(p')$, then the biggest p' is chosen. For example, in the present invention, the gray scale range parameter r can be set equal to 100.

Subsequently, the background parameter estimation 420 is for estimating the mean value and the variables in the background region. According to the method of the present invention, the positions of all the pixels with the gray scale p' in the difference image are determined, and then taking each pixel as a center, an estimation window w with size N is utilized to calculate the mean value and the standard deviation within this estimation window. The calculation can be performed according to Formula (7) and Formula (8), which means that Formula (7) is utilized for calculating the mean value within the estimation window, and Formula (8) is utilized for calculating the standard deviation within the estimation window.

Because of taking p' and the pixels nearby into consideration, the accuracy of the estimation parameter increases. The estimation window in the present invention can be a 3*3 working window. Afterwards, all the estimated mean values and standard deviations are averaged to obtain a mean value of background illumination ($I_{\mu_b}$) and a standard deviation of background illumination ($I_{Std_b}$) of the background parameter. The calculation can be performed according to Formula (9) and Formula (10), which means that Formula (9) is utilized to calculate the background mean value, and Formula (10) is utilized to calculate the background standard deviation.

Pixel classification 430 utilizes the background standard deviation derived from the above mentioned parameter estimation, and then multiplies by a constant c to get the threshold value. Afterwards, if the difference between the pixel value of the difference image frame and the background mean value is greater than the threshold value, then the pixel is classified into the foreground region (expressed as gray scale 255). Otherwise, the pixel is classified into the background region (expressed as gray level 0), meaning that the pixels classified into the foreground region are expressed as bright points, and the pixels classified into the background are expressed as dark points.

The constant c controls the intensity of pixel classification. When c is low, it is possible to determine noise as the foreground erroneously. On the other hand, when c is high, it is possible to determine the small motion of the object as the background erroneously. Therefore, the value of the constant c is mainly decided by how drastic the variations of the frame are. If the variations in the content of the frame are more drastic, then the value of the constant c should be greater, whereas if the variations in the content of the frame are smoother, then the value of the constant c should be less. In the present invention, the range of the constant c is preferably 0 to 10.

According to the experiment of the present invention, the constant c for classifying the pixels of the difference image frame of Rain_woman is set to 10. According to the result of the experiment, after pixel classification, the image in the difference image frame is obviously affected by raindrops, the raindrops with drastic variation are determined as the foreground erroneously, and then many bright points are classified erroneously. Therefore, in this case, if the value of the constant c is raised for pixel classification, the erroneous bright points caused by raindrops are reduced.

Figure 4:
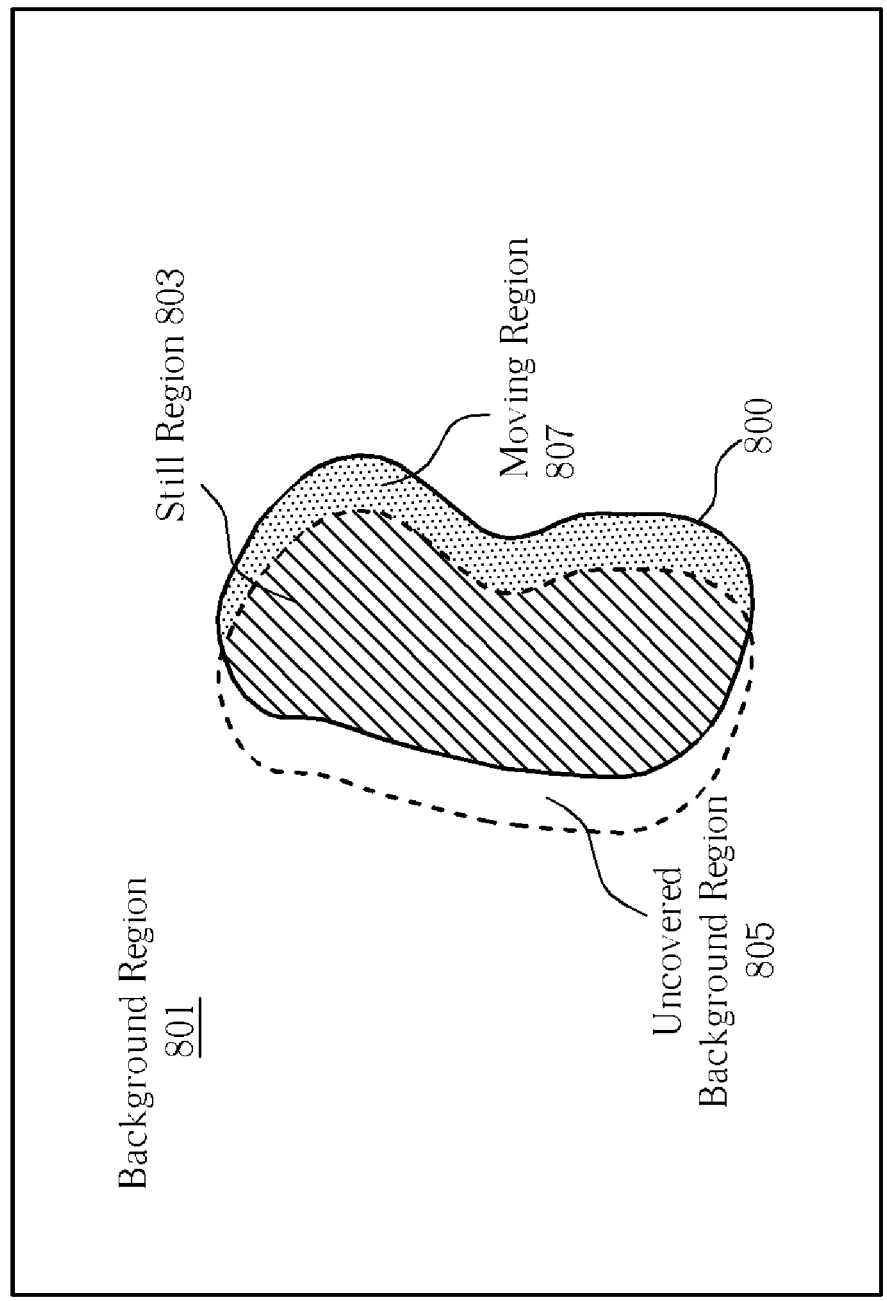
FIG. 4 is the diagram that shows with the object region detection method, when the moving object moves from the left side to the right side, four regions with different qualities are detected according to the present invention.

The main purpose of the object region decision 135 is for combining the frame difference mask, the result of change detection, with the background subtraction mask in order to detect every situation in the object region. Please refer to FIG. 4. FIG. 4 illustrates the object region detection according to the present invention. When the moving object 800 moves from the left side to the right side, four regions with different qualities are detected: a background region 801, a still region 803, an uncovered background region 805, and a moving region 807, and the dotted line represents the outline of the moving object in the previous frame.

Usually in the change detection technology, the still region is often erroneously determined as the background region, and the uncovered background region is often erroneously determined as part of moving objects. Although some prior art has already given a solution to these two situations, the solution involves detecting the uncovered background region with motion estimation technology, so the solution requires a lot of calculations.

In order to prevent making the wrong determinations in the still region and in the uncovered background region, and to avoid an increase in the load of calculations, the present invention utilizes a difference frame mask with a background subtraction mask to detect every region. Please refer to FIG. 5. FIG. 5 shows the lists of the determined results of four different regions in FIG. 4 with object region detection, wherein "ON" represents that the determined result of the pixel on the mask is "changed", and "OFF" represents "unchanged". Based on the method lists in FIG. 5, the background region 801 and the uncovered region 805 can be deleted from the mask according to the detected result. Therefore, the object region detection can only output the moving region 807 and the still region 803, and combine the moving region 807 with the still region 803, so an initial object mask can be outputted.

In the above-mentioned technology, the motion information is obtained from the change detection method, and then the initial object mask is obtained through the object region detection, wherein the change detection method obtains the motion information through the object moving variations between frames. But sometimes in the frames, variations occur not only in the moving objects, but the background may also exhibit variations. For example, under rainy conditions, whole frames show contiguous variations. At this time, the detected result is easily affected, such that the moving object region is also easily determined erroneously. Because the raindrops have the transparent physical quality, which is transmitted by light, and the speed of motion of raindrops is very rapid, the raindrops in frames form a vague, thin and long shape. Although the rain makes the frames more vague, most of the edge information in the frames is preserved.

Figure 6:
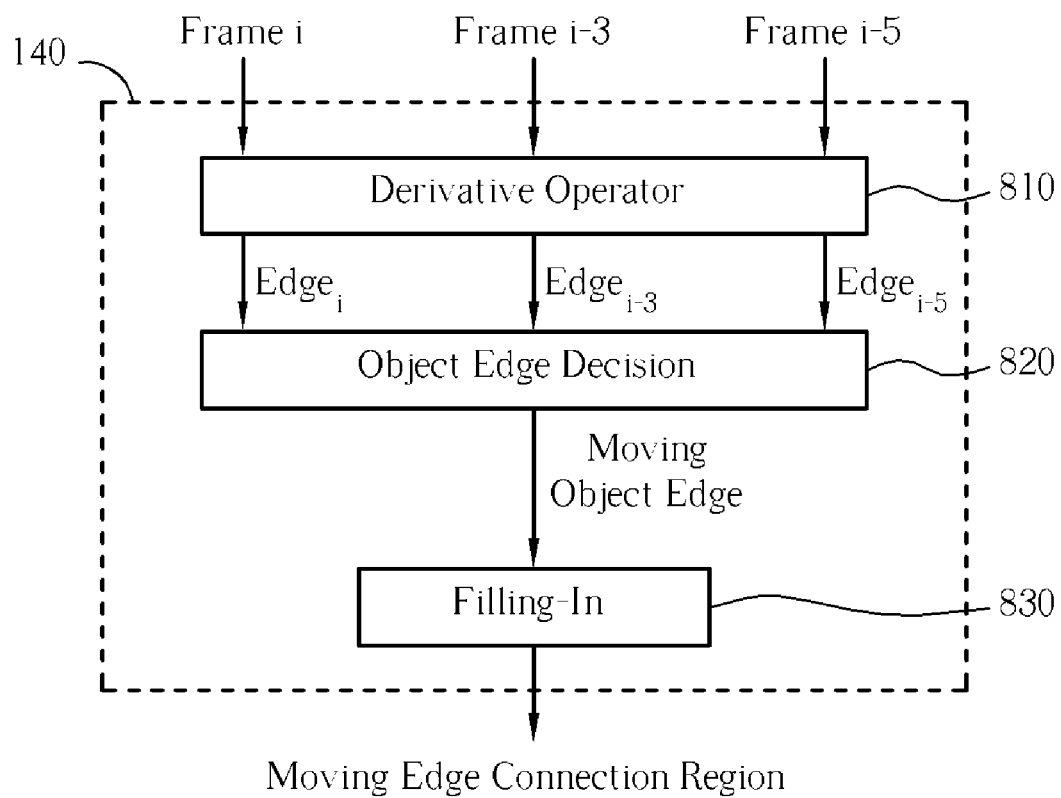
FIG. 6 is a functional block flow chart of the edge detection.

Therefore, the present invention provides the edge detection method 140 to obtain the main edge information, and then sets the region range of the moving object in order to compensate for the region determination ability of the change detection technology under rainy conditions. Please refer to FIG. 6. FIG. 6 is a functional block flow chart of the edge detection 140. The edge detection 140 comprises a derivative operator 810, an object edge decision 820, and a filling-in 830. "Edge" is defined as variations in gray scale, and the object edge decision targets these variations to perform detection in order to obtain the edge information. Generally speaking, the edge detection utilizes the derivative concept to detect the variations of the image edge, and because of the discrete quality of the image, the derivative operator 810 utilizes the difference approximation to replace the linear operation of the original derivative operation, and then performs the derivative operation once again to get the $2^{nd}$ derivative edge detection function. The $2^{nd}$ derivative function can be expressed as the following Formula (14):

$$\nabla I^2(x, y) = \left(\frac{\partial^2 I}{\partial x^2}, \frac{\partial^2 I}{\partial y^2}\right),$$

$$\frac{\partial^2 I}{\partial x^2} \approx \frac{\Delta^2 I}{\Delta x^2} = \frac{\Delta I_2 - \Delta I_1}{\Delta x_2 - \Delta x_1},$$

$$\frac{\partial^2 I}{\partial y^2} \approx \frac{\Delta^2 I}{\Delta y^2} = \frac{\Delta I_2 - \Delta I_1}{\Delta y_2 - \Delta y_1}$$

Formula (14)

The $1^{st}$ derivative function is the most basic derivative operation, therefore the description of the $1^{st}$ derivative operation is omitted here.

Figure 7:
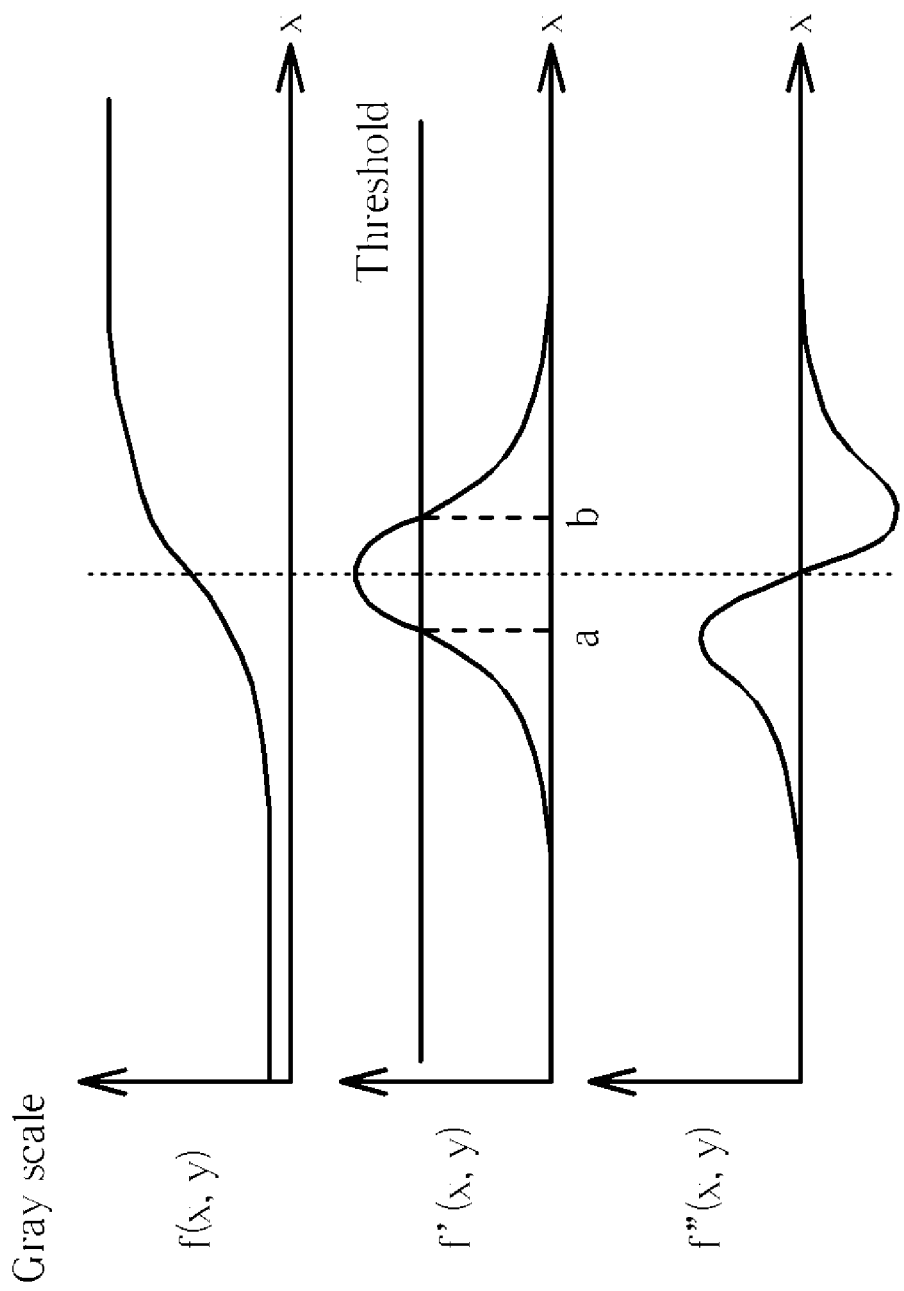
FIG. 7 is the distribution graph of the gray scale of the image in the spatial domain, and the function distribution graph of the $1^{st}$ derivative and the $2^{nd}$ derivative.

If the $1^{st}$ derivative function and $2^{nd}$ derivative function are transformed into the functional graphs, the changes of the image edges after the derivative gradient operation can be seen very clearly. Please refer to FIG. 7. FIG. 7 is the distribution graph of the gray scale of the image in the spatial domain, and the function distribution graph of the $1^{st}$ derivative and the $2^{nd}$ derivative.

At the top of FIG. 7, the function graph shows the cross section graph of the distribution of the gray scale of the image in the x direction. Obviously, the distribution is from a smooth region of low gray scale value to a smooth region of high gray scale value, and the slope in the middle of the graph shows the edge variations between these two regions. After the $1^{st}$ derivative operation, the function graph is shown in the middle of FIG. 7; in FIG. 7, most of the smooth regions approximate to gray scale zero, and the slope in the top graph becomes a mountain ridge, wherein the range of the mountain ridge in a broad sense is the edge region. But, in order to obtain more precise positions of the edges, a threshold value is used to define the real edge region (the region marked between a and b in FIG. 7). Once again, the derivative operation is performed, and the function graph of the $2^{nd}$ derivative is obtained in the bottom of FIG. 7. The graph is similar to the function curve of the sine wave, and the position of the zero point in the graph of $2^{nd}$ derivative function corresponds to the top point in the graph of the $1^{st}$ derivative function, normally called the zero-crossing point.

From the above, the zero-crossing point, after the $2^{nd}$ derivative, whose value becomes zero, and after the $1^{st}$ derivative, whose value becomes the maximum of the function, must be disposed in the inner part of the edge region, which means that the zero-crossing point is the most possible point belonging to the edge. Therefore, the present invention utilizes the characteristics of the zero-crossing point to determine the threshold value of the edge detection. Suppose the position of the zero-crossing point in the image is disposed in the region the pixel of the lowest pixel value belongs to, a 5*5 mask is utilized to search the whole image, and the pixel of the lowest pixel value in the mask is marked as a candidate point expressed as CP in the following Formula (15):

$$CP_i = \{p | \min(Mask_{n \times m}(p)), p \in GI_i, 0 \leq n < 5, 0 \leq m < 5\}$$

Formula (15)

In Formula (15), "GI" represents the gradient image, i represents the $i^{th}$ frame, p represents the pixel in the gradient image $GI_i$, the size of mask is n*m, wherein n and m can both be supposed to equal 5.

In order to avoid the situation in which, when the pixel value is equal to zero, the pixels in the background region and the pixels in the smooth region are determined erroneously, filtering of the pixels other than the zero-crossing points is necessary. Therefore, after obtaining all the candidate points CP, all the CP points which are able to produce the gradient image $GI_i$ of the $i^{th}$ frame are gathered into a $CP_i$ set, each CP is taken as a center with a 3*3 mask, and if the difference between the center point and an adjacent point in the mask is greater than a threshold value τ, and the quantity of all the adjacent points which satisfy the above condition is more than 4, then this CP is kept and marked as a zero-crossing point expressed as ZCP in the following Formula (16):

$$ZCP_i = \{p | \text{Num}(|p-p'|>\tau)>4, p \in CP_i, p' \in \text{Mask}_{n \times m}(p), 0 \le n < 3, 0 \le m < 3\} \quad \text{Formula (16)}$$

In Formula (16), p' is the adjacent pixel point of the center point in the mask, and the default threshold value τ can be set as 10.

When determining all the positions of ZCP, each ZCP is taken as a center, an estimation window with size N is utilized, and the mean value and the standard deviation in the estimation window are calculated using the two functions listed below:

$$\mu_{w_i}(x) = \frac{1}{N} \sum_{j=1}^{N} w_i(j) \text{ for } i = 1, 2, \ldots, ZCP(x) \quad \text{Formula (17)}$$

$$std_{w_i}(x) = \sqrt{\frac{1}{N} \sum_{j=1}^{N} [w_i(j) - \mu_{w_i}(x)]^2}$$

$$\text{for } i = 1, 2, \ldots, ZCP(x) \quad \text{Formula (18)}$$

In Formula (17) and Formula (18), N can be set as 9, wherein Formula (17) is for calculating the mean value in the estimation window, and Formula (18) is for calculating the standard deviation in the estimation window.

Taking the zero-crossing point as a center, the pixels nearby the center are the most probable edge points. Therefore, the center and the pixels nearby are taken into consideration in order to raise the accuracy of the estimation parameter. In the present invention, the estimation window is a 3*3 working window. Afterwards, according to the following Formula (19) and Formula (20), all the mean values and standard deviations are averaged in order to set a parameter for determining the edge pixel:

$$\mu_{Edge}(x) = \frac{1}{ZCP(x)} \sum_{j=1}^{ZCP(x)} \mu_{w_i}(x) \quad \text{Formula (19)}$$

$$\text{for } i = 1, 2, \ldots, ZCP(x)$$

$$std_{Edge}(x) = \frac{1}{ZCP(x)} \sum_{i=1}^{ZCP(x)} std_{w_i}(x) \quad \text{Formula (20)}$$

$$\text{for } i = 1, 2, \ldots, ZCP(x)$$

Therefore determining the edge pixels from the gradient image is utilizing the edge standard deviation derived from the above estimation parameter as a threshold value $Th_{edge}$. If the difference between the pixel in the gradient image and the edge mean value is greater than the threshold value $Th_{edge}$, then the pixel is classified into the edge region (expressed as gray level 255). Otherwise, the pixel is classified into the background region (expressed as gray level 0).

Through the above method, the edge information of the frame can be derived, which is an "edge map", which still comprises some edge regions belonging to the background region. But, only the edges of moving objects are needed, therefore classifying the edges further into static edges and moving edges, the static edges belong to the background, and the moving edges belong to the moving objects.

The object edge detection 820 of the present invention utilizes the concept of multi-frame analysis to exclude the background edges from the edge map, and keep only the edge parts of moving objects. Because relationships between pixels in video frames are very close, with this characteristic suppose the edge point in the edge map of the current frame is classified into the still region, which means the edge point at the same position in the previous several frames should be classified into the still region. In other words, if the pixel in the current frame is classified as the edge point, and the pixel at the same position in the previous several frames is also classified as the edge point, then the pixel in the current frame should be classified into the still region. To sum up, if a pixel value of a pixel is zero, it represents the pixel is not classified into the edge region, and the pixel is classified as a non-edge point, i.e. part of the background; if a pixel value of a pixel is 255, and the pixel value of the pixel at the same position in the previous frame is also 255, then the pixel should be classified into the still region, i.e. part of the background; but, if a pixel does not belong to the above two conditions, then the pixel should be considered part of the moving object. The above-mentioned method can be expressed as the following Formula (21):

if $(\text{Edge}_i(p)=0)$ not edge pixel else if $(\text{Edge}_i(p)=\text{Edge}_{i-n}(p)=\text{Edge}_{i-m}(p)=255)$ static edge pixel else initial moving edge pixel  Formula (21)

In Formula (21), p represents the pixel, i represents the $i^{th}$ frame, and n and m can be set as 3 and 5. That means $\text{Edge}_i$ represents the $i^{th}$ frame after the analysis and process of the gradient operation process 810, $\text{Edge}_{i-m}$ represents the $(i-m)^{th}$ frame before the $i^{th}$ frame after the analysis and process of the gradient operation process 810, and $\text{Edge}_{i-n}$ represents the $(i-n)^{th}$ frame before the $i^{th}$ frame after the analysis and process of the gradient operation process 810. That means the frame buffer 120 offers the $i^{th}$ frame, the $(i-m)^{th}$ frame, and the $(i-n)^{th}$ frame to the edge detection 140, and after the analysis and processing of the gradient operation process 810, these three frames produce another three frames $\text{Edge}_i$, $\text{Edge}_{i-m}$, and $\text{Edge}_{i-n}$ so as to allow the object edge detection 820 to perform further processes. The adjacent frames are not utilized because the relationships of the moving object between the adjacent frames are too close, making it likely that the moving edge will be determined to be the still edge erroneously, especially when the motion speed of the moving object is slower.

Considering the situation of rainy conditions, raindrops can be detected because the variations of the raindrops are greater than the threshold value, and thus become noise of non-motion objects. In order to get a more precise object edge region, and exclude the noise caused by the raindrops, the present invention combines the initial object mask derived from the change detection. That is, if the moving edge pixel derived from the Formula (21) is also the pixel in the initial object mask, then the pixel is determined to belong truly to part of the moving object edge. The above-mentioned conditions of the edge decision can be expressed in the following Formula (22):

$$\text{Moving region}_i = \{p | p \in \text{Initial Moving Edge}_i, p \in \text{IOM}_i\} \quad \text{Formula (22)}$$

Figure 8:
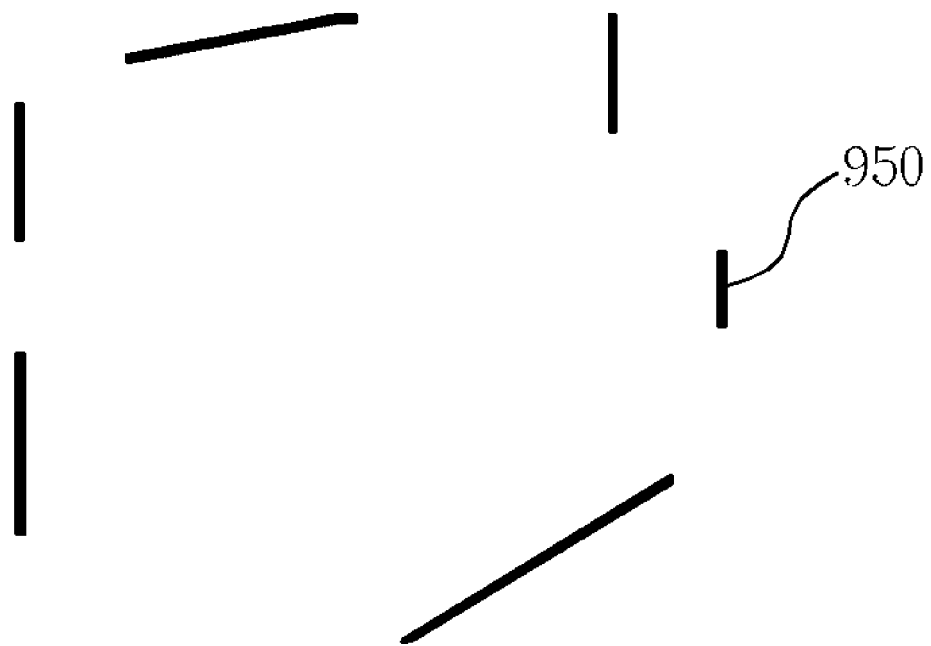
FIG. 8 is an incomplete shape of a moving object.
Figure 9:
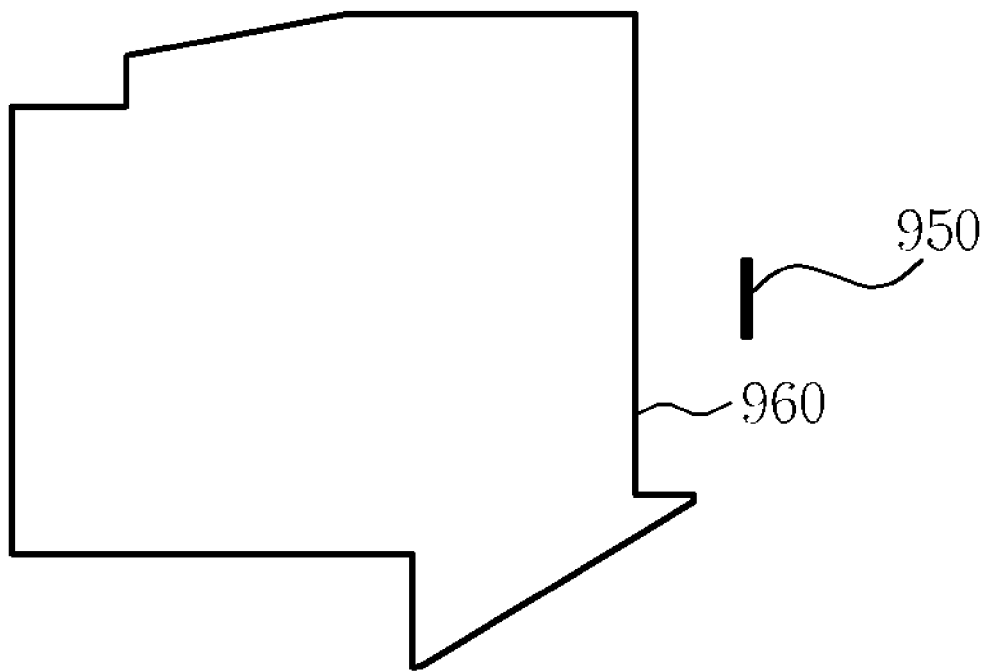
FIG. 9 is a filled-in shape graph of the moving object in FIG. 8 after scanning and connecting horizontally and vertically each once respectively.
Figure 10:
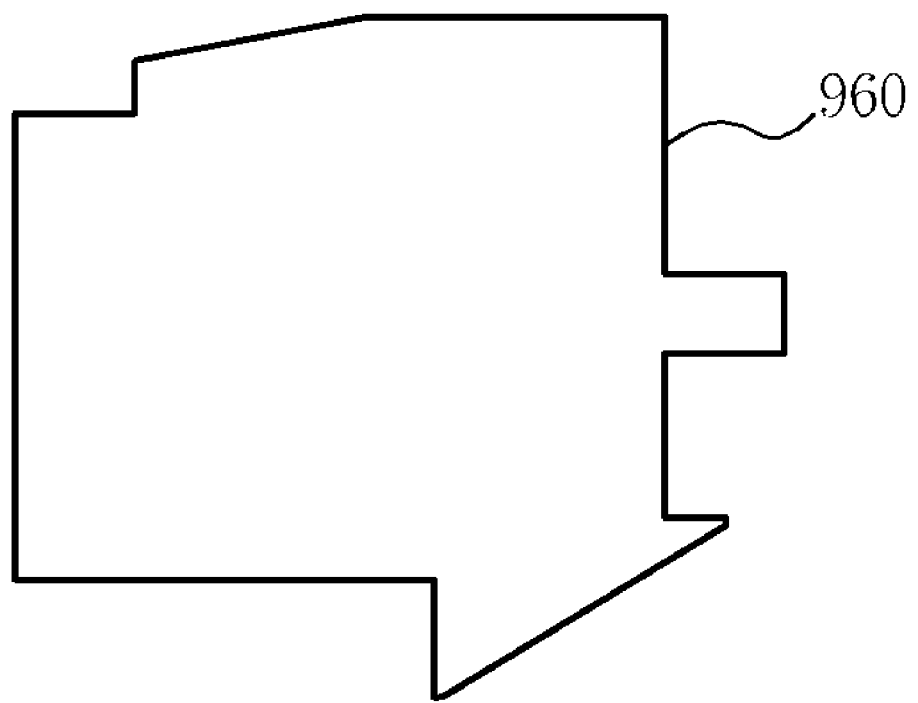
FIG. 10 is the more complete shape of the moving object of in FIG. 8 obtained after scanning three times.

The above mentioned edge detection method of the moving object can only produce the edge region of the moving object, but the edges do not necessarily form a complete shape. Therefore, the object filling-in method 830 of the present invention utilizes a scan method for filling in the object in order to determine the complete shape of the moving object. The scan method for filling-in the object mentioned in the prior art is scanning the whole image horizontally, and then, for each column, connecting all the pixels within the moving object edge, and setting the gray scale of the connected pixels to 255. Afterwards, the whole image is scanned vertically, and for each row, all the pixels within the moving object edge are connected, and the gray scale of the connected pixels is set to 255. Then, the whole image is scanned horizontally again, and for each column, all the pixels within the moving object edge are connected, and the gray scale of the connected pixels is set to 255. Please refer to FIG. 8 to FIG. 10. FIG. 8 is an incomplete shape of a moving object. FIG. 9 is a filled-in shape graph of the moving object 960 in FIG. 8 after scanning and connecting horizontally and vertically each once, respectively (the shape of the moving object 960 is circled by a real line). In FIG. 9, on the right side, a vertical edge line 950 has not been connected, because in FIG. 8, the vertical edge line on the right side corresponds to the central gap between the two vertical edge lines on the left side. Therefore, during the first horizontal scan, no corresponding pixel is connected. Hence, a second horizontal scan is needed to compensate for the possibly lost region after the first horizontal scan. FIG. 10 is the more complete shape of the moving object 960 of in FIG. 8 obtained after scanning three times, wherein the filling-in graph of the moving object can be used as a moving object mask for the following segmentation of the moving object 960, and the shape of the moving object 960 is circled by a real line in FIG. 10.

The above scan method for filling-in the object of the prior art is effective only for a single object. If there are several objects in a frame, then this method may comprise the background. Therefore, the object filling-in method 830 of the present invention adds two judgment factors, "distance" and "pixel difference", to improve the above object filling-in method. First, the first edge point scanned during the first horizontal scan is marked as a "First_index", and afterwards, when scanning the second edge point, it is determined whether the distance between the "First_index" and the second edge point is less than a predetermined distance. If so, the second edge point is marked as a "Second_index", and the method continues scanning the next edge point. Otherwise, the last edge point is marked as a "Last_index", and all the edge points scanned up to present are set as CIPs (candidate isolated points), and one is added to the weighting value (because the first edge point has already become an isolated point). Subsequently, the pixels between "First_index" and "Last_index" are connected. The above method can be expressed in the following Formula (23):

if (|First_index−Edge($p$)|<distance)

Second_index=Edge($p$) and search next pixel else

Last_index=Second_index and CIP(Edge($p$))+1     Formula (23)

In Formula (23), Edge(p) represents the pixels of the moving edge image.

Afterwards, it is determined whether the background pixels are included when connecting the pixels between "First_index" and "Last_index". The object filling-in method 830 utilizes illumination, hue, and saturation information to compare the about-to-be-connected pixel with the background pixels. If the differences between the illumination, the hue, and the saturation of the about-to-be-connected pixel and the mean value of the illumination, the hue, and the saturation of the background are greater than the standard deviation of the illumination, the hue, and the saturation of the background, respectively, then the about-to-be-connected pixel is different from the background, so the about-to-be-connected pixel can be determined as a should-be-connected pixel, and then the connecting action is executed, otherwise this pixel is excluded. Suppose all the connected pixels form a set called MECR (moving edge connection region). MECR can then be expressed in the following Formula (24):

$$\text{MECR} = \{p \,|\, |p-I_{\mu_b}| > I_{std_b}, |p-S_{\mu_b}| > S_{std_b}, |p-H_{\mu_b}| > H_{std_b}, \text{First\_index} < p < \text{Last\_index}\} \text{ if (CIP}(p) > 2) \text{ the pixel is removed} \quad \text{Formula (24)}$$

Last, after finishing the horizontal and vertical scans three times, the CIPs whose weighting value is greater than 2 are excluded, because these pixels do not connect to any other object, even after three scans. These pixels can thus be seen as isolated points, and excluded.

In Formula (24), p represents the pixel between "First_index" and "Last_index", $I_{\mu_b}$ represents the mean value of the background illumination, $I_{std_b}$ represents the standard deviation of the background illumination, $S_{\mu_b}$ represents the mean value of the background saturation, $S_{std_b}$ represents the standard deviation of the background saturation, $H_{\mu_b}$ represents the mean value of the background hue, and $H_{std_b}$ represents the standard deviation of the background hue.

In another experiment of the present invention, a frame in the "Rain_people" video is raised, and after processing by the moving object edge detection method, an edge frame of the moving object is determined, and then the edge frame of the moving object is scanned and filled in horizontally and vertically three times as mentioned in the prior art, so as to get a moving object mask, or the edge frame of the moving object is processed by the scan and fill-in method of the present invention so as to get a moving object mask. According to the result of the experiment, the accuracy of the moving object mask derived from the method of the present invention is better than the accuracy of the moving object mask derived from the method of scanning and filling up horizontally and vertically three times utilized in the prior art.

After the process of object segmentation, the moving object can be segmented from the frame, but the characteristic and behavior of the moving object cannot be produced stably and precisely, and the shape of the object may be incomplete, or the produced moving object may comprise some protruding parts which should not belong to the real moving object. These are mainly influenced by background noise, shadows, and the way the object moves, etc. The degree of the influence depends on the ambient circumstances. For example, in an indoor environment, the influence will be less serious than in an outdoor environment, because when in an indoor environment, the space is closed, therefore the background variations seldom increase the influence. But, in an outdoor environment, the influence corresponds to climate change, so the accuracy of the algorithm is influenced heavily. For example, the whole frame stays in a variation state because of rain, or when the moving object passes by puddles on the ground accumulated due to rain, the surfaces of the puddles will show the moving reflection images which form a moving reflection region, which means that the influence of the reflected images on the surfaces of the puddles decreases the accuracy of the segmentation algorithm. Therefore, the method of the present invention further comprises filling in the shape of the object, and lowering the influence of the moving reflection region on the surfaces of the puddles in order to improve the accuracy of the segmentation algorithm.

Figure 11:
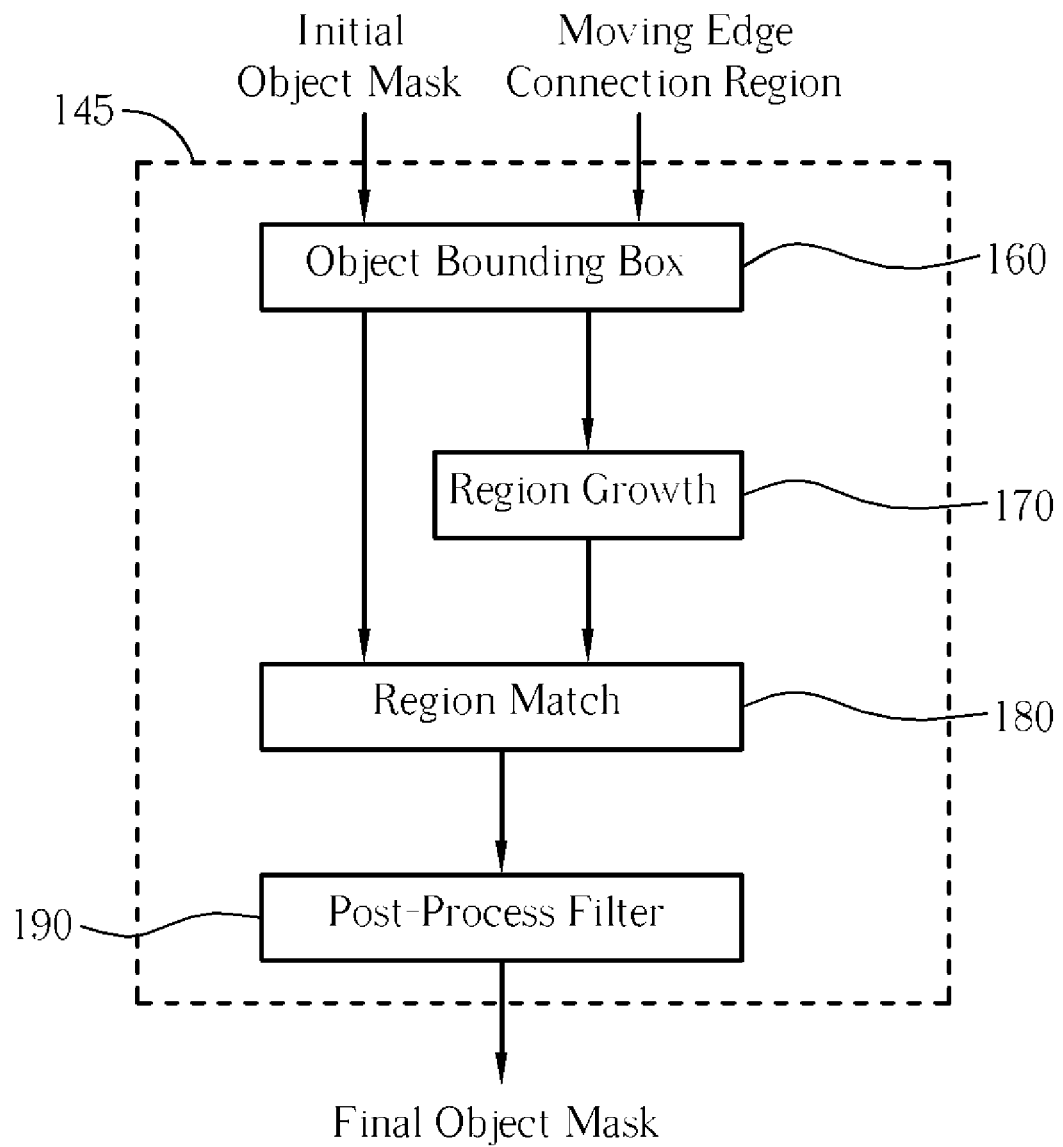
FIG. 11 is the functional block flow chart of the object bounding box match method of the present invention.

Please refer to FIG. 11. FIG. 11 is the functional block flow chart of the object bounding box match method 145 of the present invention. The object bounding box match 145 comprises an object bounding box 160, a region growth 170, a region match 180, and a post-process filter 190, wherein the input information comprises the initial object mask derived from the object region detection 135 and the moving edge connection region derived from the edge detection 140, in coordination with the hue and saturation information separated from the color transformation. In the initial object mask, the object edges are more complete, but under rainy conditions, the moving reflection regions are often shown, but should be deleted. Through the moving region mask, the moving region is derived more accurately, and the reflection regions are often excluded, because most variations of the edge pixels in the reflection regions are very similar to the background region, therefore the reflection regions are discriminated through the hue and saturation information, and then excluded. But, because of detecting the edge variations of the object with the information of the spatial domain, the shape of the object is not very stable. Therefore, on the premise that a more complete shape of the object is kept without the reflection region included, the present invention utilizes the object bounding box 160 to box the object region range in the frame, meaning that because the box region defined by the initial object mask may comprise the object region range and the reflection region range, when compared with the box range defined by the object bounding box, the reflection region can be excluded according to similarity between the reflection region and the background region.

Following the edge detection and the object filling-in procedures, a moving edge connection region is produced, but the whole shape of the moving object is not very stable. Therefore, the present invention further utilizes a region growth method 170 to compensate for the defective parts of the moving edge connection region. Before executing the region growth, the growing pixel seeds should be found first. Suppose the set of the pixel seeds is $S_{seed}$. The edge pixels of the object are utilized as the growing pixel seeds, and the Laplace operator is utilized in the prior art to obtain the pixel seeds. After obtaining the pixel seeds, the region growth is executed.

The region growth method offered by the region growth 170 utilizes a "queue" technology. Before executing the region growth method, all the pixel seeds are stored in the queue as elements of the queue, and then each element is taken out in order from the queue, and it is determined whether the difference between the pixel value of the adjacent pixel and the pixel value of the element taken out from the queue is less than a threshold value τ. If so, the adjacent pixel is sent into the queue and the adjacent pixel is classified into the growth region repeatedly, until all the elements in the queue are taken out, and the queue is completely empty, meaning that the region growth is finished. As to setting the conditions of the region growth, the illumination(I), hue(H), and saturation(S) color information are utilized, and the determining conditions are listed below:

Condition-1: Is the seed similar to the adjacent pixel?
Condition-2: Is the seed similar to the pixel corresponding to the same position in the background frame?
Condition-3: Is the adjacent pixel of the seed similar to the pixel corresponding to the same position in the background frame?

When the answer to Condition 1 is "yes," but the answers to Conditions 2 and 3 are "no," it means that this pixel is part of the moving object and is classified into the growth region. The above determination method can be expressed in the following Formula (25):

$$SR_I = S_{I_{Seed}} \cup \{N_I(q_i) \| N_I(q_i) - q_i | < \tau_I \text{ and } |I_{\mu_b} - q_i| > I_{std_b} \text{ and } |N_I(q_i) - I_{\mu_b}| > I_{std_b}, \forall q_i \in Q_I\}$$

$$SR_{Sat} = S_{Sat_{Seed}} \cup \{N_{Sat}(q_i) \| N_{Sat}(q_i) - q_i | < \tau_{Sat} \text{ and } |S_{\mu_b} - q_i| > S_{std_b} \text{ and } |N_{Sat}(q_i) - S_{\mu_b}| > S_{std_b}, \forall q_i \in Q_{Sat}\}$$

$$SR_H = S_{H_{Seed}} \cup \{N_H(q_i) \| N_H(q_i) - q_i | < \tau_H \text{ and } |H_{\mu_b} - q_i| > H_{std_b} \text{ and } |N_H(q_i) - H_{\mu_b}| > H_{std_b}, \forall q_i \in Q_H\}$$

$$SR = SR_I \cup SR_{Sat} \cup SR_H \quad \text{Formula (25)}$$

In Formula (25), $q_i$ in the former three functions represents the illumination value, the saturation value, and the hue value of the element in the queue respectively, $N_I(q_i)$ represents the illumination of the adjacent pixel of the element in the queue, $N_{Sat}(q_i)$ represents the saturation of the adjacent pixel of the element in the queue, $N_H(q_i)$ represents the hue of the adjacent pixel of the element in the queue, $\tau_I$ represents the threshold value of illumination, $\tau_{Sat}$ represents the threshold value of saturation, $\tau_H$ represents the threshold value of hue, $I_{\mu_b}$ represents the mean value of the background illumination, $I_{std_b}$ represents the standard deviation of the background illumination, $S_{\mu_b}$ represents the mean value of the background saturation, $S_{std_b}$ represents the standard deviation of the background saturation, $H_{\mu_b}$ represents the mean value of the background hue, $H_{std_b}$ represents the standard deviation of the background hue, $Q_I$ represents the set of the illumination of the elements in the queue, $Q_{Sat}$ represents the set of the saturation of the elements in the queue, $Q_H$ represents the set of the hue of the elements in the queue, and SR represents the set of the pixels in the object region after region growth.

After obtaining a more stable segmented object, the region match 180 is for comparing the range of the bounding box of the initial object and the range of the bounding box of the moving edge connection region, and based on the bounding box of the moving edge connection region, within this bounding box, combining the initial object mask and the moving region mask. The reflection region in the initial object mask could be excluded, and then the more precise shape obtained in the moving region mask, finally extracting the desired moving object segmentation region.

Regarding the process of extracting the moving object segmentation region mentioned above, in the experiment of the present invention, an initial test image is given, and this initial test image is processed with the Laplace operator to get a frame of pixel seeds, this frame of pixel seeds is processed with region growth and HSI color combination, the object region match generates the result, and through this experimental result, the accuracy of the moving object segmentation method can be observed.

The post-process filter 190 is the last process of the object region match technology, its main purpose being to eliminate small region noise in the object mask, and smooth the edges in order to get the final object mask. Eliminating the noise is mainly eliminating the background noise (the white region) in the mask frame, and the noise in objects (the black region). The method of the present invention utilizes the connected-component labeling method to eliminate the areas in the connection region whose size is less than an area threshold value.

After eliminating the small region noises in the background and in the object, the edges may still appear rough. Therefore, a morphology filter with a 3*3 structure element is utilized, including "open" and "close" to smooth the outline of the object, and after the smoothening process of the morphology filter, the object region can be obtained very precisely.

In the process of extracting the object region, the experiment of the present invention offers an object mask frame, and after eliminating the object region noise and the background noise from the object mask frame, processes the frame with the smoothing process and HSI color combination to get the final result, and through this experiment result, the accuracy of extracting the object region method can be improved.

Those skilled in the art will readily observe that numerous modifications and alterations of the device and method may be made while retaining the teachings of the invention.

What is claimed is:

1. A method for video object segmentation applied to rainy situations for segmenting a moving object from video images shot in rainy circumstances, comprising:
    detecting a first frame of video and then determining a plurality of edge pixels and a plurality of non-edge pixels;
    detecting a second frame of the video just before the first frame, and then determining a plurality of edge pixels and a plurality of non-edge pixels;
    comparing the plurality of edge pixels of the first frame with the plurality of edge pixels of the second frame, and then determining a plurality of still edge pixels and a plurality of moving edge pixels in order to produce at least one moving edge connection region;
    according to a result of determining the plurality of still edge pixels and the plurality of moving edge pixels, determining the moving object in the first frame; and
    updating a composition of a background.

2. The method of claim 1 further comprising utilizing a smooth filter to eliminate noise in the first frame and the second frame before detecting the first frame of the video.

3. The method of claim 1 wherein determining the plurality of edge pixels and the plurality of non-edge pixels of the first frame comprises performing a derivative operation on the first frame to produce a first gradient image, and then determining the plurality of edge pixels of the first frame according to the first gradient image.

4. The method of claim 1 wherein determining the plurality of edge pixels and the plurality of non-edge pixels of the second frame comprises performing a derivative operation on the second frame to produce a second gradient image, and then determining the plurality of edge pixels of the second frame according to the second gradient image.

5. The method of claim 1 wherein determining the plurality of still edge pixels and the plurality of moving edge pixels comprises:
    determining the plurality of pixels as still edge pixels if a location of the plurality of edge pixels in the first frame is the same as a location of the plurality of edge pixels in the second frame; and
    determining the plurality of pixels as moving edge pixels if a location of the plurality of edge pixels in the first frame is the same as a location of the plurality of non-edge pixels in the second frame.

6. The method of claim 5 wherein determining the plurality of still edge pixels and the plurality of moving edge pixels further comprises:
    producing a moving edge pixel image according to the moving edge pixels determined in the first frame, and utilizing a scan method for filling in the object, first scanning the moving edge pixel image horizontally, and then connecting the pixels between two adjacent moving edge pixels in each column, and all the connected pixels with the original determined moving edge pixels forming a first group of moving edge pixels;
    scanning the moving edge pixel image vertically, and then connecting the pixels between two adjacent moving edge pixels of the first group of moving edge pixels in each row, and all the connected pixels with the original determined moving edge pixels forming a second group of moving edge pixels; and
    scanning the moving edge pixel image horizontally again, and then connecting the pixels between two adjacent moving edge pixels of the second group of moving edge pixels in each column to determine a shape region.

7. The method of claim 5 wherein determining the plurality of still edge pixels and the plurality of moving edge pixels further comprises:
    estimating an mean value of background illumination, a standard deviation of background illumination, an mean value of background saturation, a standard deviation of background saturation, an mean value of background hue, and a standard deviation of background hue;
    producing a moving edge pixel image according to the determined moving edge pixels in the first frame, and utilizing a scan method by filling in the object, first scanning the moving edge pixel image horizontally, connecting the pixels disposed between a first moving edge pixel and a second moving edge pixel if a distance between the first moving edge pixel scanned along the edge pixel image by columns and the second moving edge pixel scanned along the edge pixel image by columns next to the first moving edge pixel after connecting the first moving edge pixel is less than a default value, and differences between illumination of pixels disposed between the first moving edge pixel and the second moving edge pixel and the mean value of background illumination are greater than the standard deviation of background illumination, differences between saturation of pixels disposed between the first moving edge pixel and the second moving edge pixel and the mean value of background saturation are greater than the standard deviation of background saturation, and differences between hue of pixels disposed between the first moving edge pixel and the second moving edge pixel and the mean value of background hue are greater than the standard deviations of background hue;
    alternatively scanning the moving edge pixel image vertically, and connecting the pixels disposed between the first moving edge pixel and the second moving edge pixel if a distance between the first moving edge pixel scanned along the edge pixel image by columns and the second moving edge pixel scanned along the edge pixel image by columns next to the first moving edge pixel after connecting the first moving edge pixel is less than a default value, and differences between illumination of pixels disposed between the first moving edge pixel and the second moving edge pixel and the mean value of background illumination are greater than the standard deviation of background illumination, differences between saturation of pixels disposed between the first moving edge pixel and the second moving edge pixel and the mean value of background saturation are greater than the standard deviation of background saturation, and differences between hue of pixels disposed between the first moving edge pixel and the second moving edge pixel and the mean value of background hue are greater than the standard deviations of background hue; and subsequently scanning the moving edge pixel image horizontally again, and connecting the pixels disposed between the first moving edge pixel and the second moving edge pixel to determine a shape region if a distance between the first moving edge pixel scanned along the edge pixel image by columns and the second moving edge pixel scanned along the edge pixel image by columns next to the first moving edge pixel after connecting the first moving edge pixel is less than a default value, and differences between illumination of pixels disposed between the first moving edge pixel and the second moving edge pixel and the mean value of background illumination are greater than the standard deviation of background illumination, differences between saturation of pixels disposed between the first moving edge pixel and the second moving edge pixel and the mean value of background saturation are greater than the standard deviation of background saturation, and differences between hue of pixels disposed between the first moving edge pixel and the second moving edge pixel and the mean value of background hue are greater than the standard deviations of background hue.

8. The method of claim 7 wherein producing the moving edge pixel image according to the moving edge pixels determined in the first frame comprises:

performing an illumination subtraction from the first frame to the second frame in order to produce a difference image of illumination, and then analyzing the difference image of illumination with a histogram, picking out illumination of the most pixels in an illumination range, and, according to the quantity of the most pixels, calculating a mean value of background illumination and a standard deviation of background illumination;

performing a saturation subtraction from the first frame to the second frame in order to produce a difference image of saturation, and then analyzing the difference image of saturation with a histogram, picking out saturation of the most pixels in a saturation range, and, according to the quantity of the most pixels, calculating a mean value of background saturation and a standard deviation of background saturation; and performing a hue subtraction from the first frame to the second frame in order to produce a difference image of hue, analyzing the difference image of hue with a histogram, picking out hue of the most pixels in a hue range, and, according to the quantity of the pixels, calculating a mean value of background hue and a standard deviation of background hue.

9. The method of claim 1 wherein determining the moving object in the first frame comprises:

detecting differences between the first frame and the second frame to produce a detected result;

segmenting the first frame into a moving region, a still region, a background region, and an uncovered background region according to the detected result to produce a segmented result;

producing an initial object mask (IOM) according to the segmented result;

storing a plurality of moving edge pixels of at least one moving edge connection region in a queue as pixel seeds for region growth in a growth region, taking out a pixel seed in order from the queue, determining if an adjacent pixel belongs to the growth region and storing the adjacent pixel in the queue if a difference between a pixel value of the pixel seed and a pixel value of the adjacent pixel is less than a threshold value, and then continuing region growth to produce the growth region;

determining the moving object from the first frame according to the growth region and the initial object mask.

10. The method of claim 9 wherein detecting differences between the first frame and the second frame to produce the detected result comprises:

detecting a difference between pixel values of the first frame and pixel values of the second frame to produce a first detected result; and detecting a difference between pixel values of the first frame and pixel values of the background composition to produce a second detected result;

wherein segmenting the first frame is executed according to the first detected result and the second detected result simultaneously.

11. The method of claim 9 wherein detecting differences between the first frame and the second frame comprises:

analyzing a gray level difference distribution from the differences of the pixel values to determine a specific gray level difference of the most pixels;

determining a standard deviation of the background corresponding to a specific background model according to the specific gray level difference and the quantity of the most pixels; and classifying a plurality of pixels in the first frame according to the standard deviation of the background.

12. The method of claim 9 wherein storing the plurality of moving edge pixels of the at least one moving edge connection region in the queue as the pixel seeds for region growth in the growth region, taking out the pixel seed in order from the queue, determining if an adjacent pixel belongs to the growth region, storing the adjacent pixel in the queue, and continuing region growing comprises determining the adjacent pixel belongs to the growth region, storing the adjacent pixel in the queue, and continuing region growing if a difference between illumination of the pixel seed taken out from the queue and illumination of the adjacent pixel is less than a threshold value, a difference between the illumination of the pixel seed and a mean value of background illumination is greater than a standard deviation of background illumination, and a difference between the illumination of the adjacent pixel and the mean value of background illumination is greater than the standard deviation of background illumination.

13. The method of claim 12 further comprising:

performing an illumination subtraction from the first frame to the second frame to produce a difference image of illumination;

analyzing the difference image of illumination with a histogram;

picking out illumination of the most pixels in an illumination range; and calculating the mean value of background illumination and the standard deviation of background illumination according to the most pixels.

14. The method of claim 13 further comprising choosing pixels corresponding to the highest illumination among the plurality of illumination of the most pixels to calculate the mean value of background illumination and the standard deviation of background illumination.

15. The method of claim 9 wherein storing the plurality of moving edge pixels of the at least one moving edge connection region in the queue as the pixel seeds for region growth in the growth region, taking out the pixel seed in order from the queue, determining if an adjacent pixel belongs to the growth region, storing the adjacent pixel in the queue, and continuing region growing comprises determining the adjacent pixel in the growth region and storing the adjacent pixel in the queue, and continuing region growing if a difference between saturation of the pixel seed taken out from the queue and saturation of the adjacent pixel is less than a threshold value, a difference between the saturation of the pixel seed and a mean value of background saturation is greater than a standard deviation of background saturation, and a difference between the saturation of the adjacent pixel and the mean value of background saturation is greater than the standard deviation of background saturation.

16. The method of claim 15 further comprising:
performing a saturation subtraction from the first frame to the second frame in order to produce a difference image of saturation;
analyzing the difference image of saturation with a histogram;
picking out saturation of the most pixels in a saturation range; and
calculating the mean value of background saturation and the standard deviation of background saturation according to the pixels corresponding to the picked out saturation.

17. The method of claim 16 further comprising choosing pixels corresponding to the highest saturation among the plurality of saturation of the most pixels to calculate the mean value of background saturation and the standard deviation of background saturation.

18. The method of claim 9 wherein storing the plurality of moving edge pixels of the at least one moving edge connection region in the queue as the pixel seeds for region growth in the growth region, taking out the pixel seed in order from the queue, determining if an adjacent pixel belongs to the growth region, storing the adjacent pixel in the queue, and continuing region growing comprises determining the adjacent pixel in the growth region and storing the adjacent pixel in the queue, and continuing region growing if a difference between hue of the pixel seed taken out from the queue and hue of the adjacent pixel is less than a threshold value, a difference between the hue of the pixel seed and a mean value of background hue is greater than a standard deviation of background hue, and a difference between the hue of the adjacent pixel and the mean value of background hue is greater than the standard deviation of background hue.

19. The method of claim 18 further comprising:
performing a hue subtraction from the first frame to the second frame to produce a difference image of hue;
analyzing the difference image of hue with a histogram;
picking out hue of the most pixels in a hue range; and
calculating the mean value of background hue and the standard deviation of background hue according to the pixels corresponding to the picked out hue.

20. The method of claim 19 further comprising choosing pixels corresponding to the highest hue among the plurality of hue of the most pixels to calculate the mean value background hue and the standard deviation of background hue.

21. The method of claim 1 wherein comparing the plurality of edge pixels of the first frame with the plurality of edge pixels of the second frame, and determining the plurality of still edge pixels and the plurality of moving edge pixels further comprises removing a moving edge connection region among the at least one moving edge connection region if an area of the moving edge connection region is less than a threshold value.

22. The method of claim 1 wherein comparing the plurality of edge pixels of the first frame with the plurality of edge pixels of the second frame, and determining the plurality of still edge pixels and the plurality of moving edge pixels further comprises eliminating noise in shape of the moving object.

23. The method of claim 1 wherein comparing the plurality of edge pixels of the first frame with the plurality of edge pixels of the second frame, and determining the plurality of still edge pixels and the plurality of moving edge pixels further comprises smoothing fringes of shape of the moving object.

* * * * *